United States Patent Office 3,562,363
Patented Feb. 9, 1971

3,562,363
O-CATECHOL O-HYDROCARBYL-VINYL
PHOSPHONATES AND PROCESS FOR
MAKING SAME
David I. Randall, Easton, Pa., assignor to GAF Corporation, New York, N.Y., a corporation of Delaware
No Drawing. Filed Mar. 22, 1967, Ser. No. 624,995
Int. Cl. C07f 9/40; A01n 9/36
U.S. Cl. 260—953                                    11 Claims

ABSTRACT OF THE DISCLOSURE

The compounds are esters and half esters of vinylphosphonic acid represented by the following structural formula:

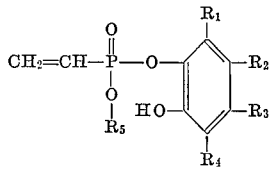

wherein $R_1$–$R_4$ are either hydrogen, alkyl, alkoxy, or halo and two of the substituent groups may form a condensed ring and $R_5$ is either hydrogen, an aromatic, a cycloaliphatic, or an aliphatic group, wherein the carbon atom linked to the oxygen is not tertiary. The compounds possess plant growth regulating properties, e.g., control of apical dominance, and may also be employed as monomers for the production of polymers. The compounds are produced from the catechol and substituted catechol cyclic esters of vinylphosphonic acid, with the half esters being produced by hydrolysis of the cyclic ester and the esters being produced by transesterification of the cyclic ester with a suitable alcohol.

This invention relates to novel phosphorous compounds and more particularly to both novel phosphonic acid mixed esters, and half esters, compositions thereof, a method for their production and a method for producing a precursor for the novel esters.

A wide variety of esters of phosphonic acid are known in the art and many of these have agricultural applications. In general, such esters have herbicidal activity but surprisingly, the phosphonic acid esters and half esters of the invention possess plant growth regulating properties and do not demonstrate any essential phytotoxic behavior.

An object of this invention is to provide novel phosphonic acid esters and half esters.

Another object of this invention is to provide novel esters and half esters of vinylphosphonic acid.

A further object of this invention is to provide a process for producing vinylphosphonic acid esters and half esters.

Yet another object of this invention is to provide a process for producing a precursor for the vinylphosphonic acid esters and half esters.

A still further object of this invention is to provide vinylphosphonic acid esters, half esters and compositions thereof which possess plan growth regulating properties.

These and other objects of the invention should be apparent from reading the following detailed description thereof.

The objects of this invention are accomplished in one aspect by producing esters and half esters of vinylphosphonic acid having the following structural formula:

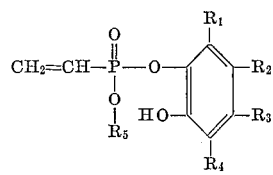

wherein $R_1$, $R_2$, $R_3$ and $R_4$ are substituent groups that are not strongly negative, such as halo, including fluoro, chloro, bromo and iodo, hydrogen, alkyl, alkoxy, preferably lower alkyl and lower alkoxy, and may be the same or different groups and two of the substituent groups may form a condensed ring, either a hydrogenated or non-hydrogenated condensed ring and $R_5$ is either hydrogen; an aliphatic or cycloaliphatic group, wherein the carbon atom linked to the oxygen is either a primary or a secondary carbon atom and not a tertiary carbon atom, such as alkyl, preferably lower alkyl, cycloalkyl, alkenyl, preferably lower alkenyl, alkynyl, preferably lower alkynyl, and their halo substituted derivatives, or an aromatic group either aryl, preferably phenyl, or substituted aryl wherein the substituent group is a non-negative substituent group, such as alkyl, preferably lower alkyl, alkoxy, preferably lower alkoxy, halo, preferably bromo or chloro and the like.

As representative examples of the half esters of the invention there may be mentioned:

2-hydroxyphenyl;
2-hydroxy-5-chlorophenyl;
2-hydroxy-4-chlorophenyl;
2-hydroxy-3,4,5,6-tetrachlorophenyl;
2-hydroxy-4-methylphenyl;
2-hydroxy-5-methylphenyl;
2-hydroxy-4-methyl-6-chlorophenyl;
2-hydroxy-3-chloro-5-methylphenyl;
2-hydroxynaphthyl;
2-hydroxy-4,6-bromophenyl;

and 2-hydroxy-3,5-bromophenyl half esters of vinylphosphonic acid and the like. As representative examples of the esters of the invention there may be mentioned:

methyl 2-hydroxyphenyl vinylphosphonate;
phenyl 2-hydroxyphenyl vinylphosphonate;
2-propynyl 2-hydroxyphenyl vinylphosphonate;
cyclohexyl 2-hydroxyphenyl vinylphosphonate;
2-methoxyethyl 2-hydroxyphenyl vinylphosphonate;
2-chloroethyl 2-hydroxyphenyl vinylphosphonate;
3-chlorophenyl 2-hydroxyphenyl vinylphosphonate;
2-ethylphenyl 2-hydroxyphenyl vinylphosphonate;
naphthyl 2-hydroxyphenyl vinylphosphonate;
4-methoxyphenyl 2-hydroxyphenyl vinylphosphonate;
2-phenylphenyl 2-hydroxyphenyl vinylphosphonate;
butyl 2-hydroxy-5-chlorophenyl vinylphosphonate;
ethyl 2-hydroxy-4-methylphenyl vinylphosphonate;
isopropyl 2-hydroxynaphthyl vinylphosphonate;
methyl 2-hydroxy-4-methylphenyl vinylphosphonate and the like. It is to be understood however, that the above mentioned compounds are only illustrative of the compounds of the invention and the scope of the invention is not to be limited thereby.

The vinylphosphonic acid mixed esters of the invention are produced by transesterifying a catechol cyclic ester of vinylphosphonic acid, represented by the following structural formula:

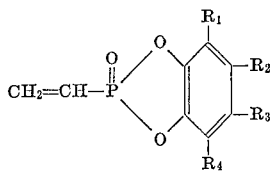

wherein R₁–R₄ are as defined above.
with an alcohol represented by the following structural formula:

wherein $R_5$ is as defined above except that $R_5$ is not hydrogen.

The transesterification of the cyclic ester, unlike general transesterification reactions, proceeds rapidly at about room temperature with evolution of heat, except for aromatic alcohols ($R_5$ above is aryl or substituted aryl), wherein slightly elevated temperatures are required. In general temperatures between about room temperature and about 100° C. are employed, except for aromatic alcohols wherein the temperature should be between about 50° C. and about 150° C. The transesterification proceeds rapidly in nearly quantitative yields and consequently, unlike general transesterification reactions, in most cases only stoichiometric quantities of alcohol are required.

The vinylphosphonic acid half esters of the invention are produced by hydrolyzing the catechol cyclic ester of vinylphosphonic acid described above. The hydrolysis of the cyclic ester, unlike hydrolysis or other phosphonate esters, proceeds rapidly at about room temperature with evolution of heat and consequently, there is no need to employ elevated temperatures, although temperatures up to about 55° C. may be employed. Temperatures higher than about 60° C. should be avoided since the phosphonic acid half esters of the invention hydrolyze at such temperatures.

The cyclic ester precursor of the compounds of the invention may be produced by the process disclosed by Yuldashev et al., Dokl. Akad. Nauk Uz. S. S. R. 21 (10) 38–40 (1964) (Chem. Abstracts 62, 9305f), both hereby incorporated by reference. Thus, as disclosed by Yuldashev et al., the precursor is produced by reacting vinylphosphonyl chloride with catechol or a substituted catechol, e.g., vinylphosphonyl chloride is heated with catechol at 100° C. for four hours and the precursor recovered by distillation in vacuo. Similarly, a substituted catechol, for example, a halo catechol, may be reacted with vinylphosphonyl chloride to produce the corresponding cyclic ester.

Alternatively, in accordance with a process of the invention, the cyclic ester precursor of the compounds of the invention may be produced from a catechol cyclic ester of beta-haloethylphosphonic acid, represented by the following structural formula:

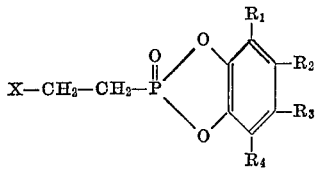

wherein R₁–R₄ are as defined above and X is a halo group, including fluoro, chloro, bromo, and iodo.

More particularly, a catechol cyclic ester of beta-haloethylphosphonic acid, preferably a catechol cyclic ester of beta-chloroethylphosphonic acid, is heated to a temperature above 160° C., preferably to between about 220° and about 280° C., to dehydrohalogenate the ester, producing the corresponding catechol cyclic ester of vinylphosphonic acid. The resulting ester of vinylphosphonic acid may then be recovered by distillation.

The catechol cyclic esters of beta-haloethylphosphonic acid employed as a starting material for producing the catechol cyclic esters of vinylphosphonic acid may be prepared in accordance with the process disclosed by Kabachnik et al., Izvest. Akak Nau SSSP, o.k.h.n. 1947, 97 (Chem. Abstracts 42, 4132e) both hereby incorporated by reference. Thus, as disclosed by Kabachnik et al., the cyclic esters of haloethylphosphonic acid are produced by reacting a beta-haloethylphosphonyl chloride with catechol or a substituted catechol, e.g., beta-chloroethyl phosphonyl chloride is heated with catechol at 150–160° C. to produce the catechol cyclic ester of beta-chloroethylphosphonic acid. Similarly, a substituted catechol, for example, a halo catechol, produced by adding chlorine or bromine to an acetic acid solution of catechol, may be reacted with beta-chloroethylphosphonyl chloride to produce the corresponding cyclic ester. As a further alternative, the catechol cyclic ester of beta-chloroethylphosphonic acid may be treated to effect substitution thereof. Thus, for example, an O-dichlorobenzene solution of the catechol cyclic ester of beta-chloroethylphosphonic acid may be warmed with an excess of sulfonyl chloride to produce a tetrachloro substituted catechol cyclic ester of beta-chloroethylphosphonic acid.

The following examples are illustrative of the invention but the scope of the invention is not to be limited thereby.

EXAMPLE I 2.0 grams of the cyclic catechol ester of vinylphosphonic acid were added to 6.0 grams of water at 25° C. An exothermic heat of hydrolysis was noted in a slight temperature rise. The water was evaporated and 2.1 grams of the catechol half ester of vinylphosphonic acid were recovered as a thick syrup. The half ester is soluble in water.

EXAMPLE II 2.5 grams of the catechol cyclic ester of vinylphosphonic acid were stirred with 6.0 grams of methanol at about room temperature and the temperature rose to about 34° C. The remaining methanol was removed by evaporation and 2.7 grams (100% of theoretical yield) of methyl 2-hydroxyphenyl vinylphosphonate were recovered as a clear viscous liquid. This phosphonate is somewhat less soluble in water than the product of Example I.

EXAMPLE III

The procedure of Example I is employed to hydrolyze the following cyclic esters and produce the corresponding half esters of vinylphosphonic acid.

1. 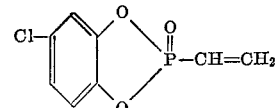

2. 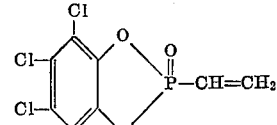

3. 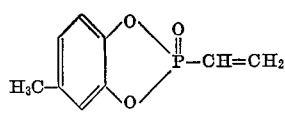

4. 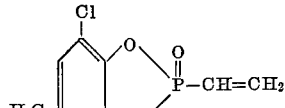

5. 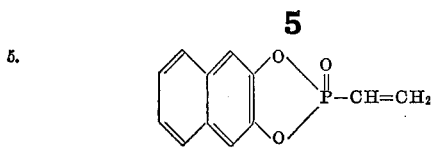

6. 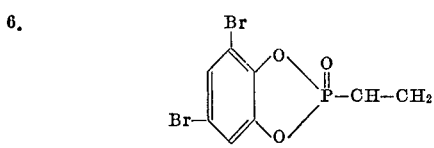

EXAMPLE IV

In accordance with the procedure of Example II, the cyclic esters of Examples II and III are transesterified with the following alcohols: cyclohexanol, lauryl alcohol, 2-ethyl-n-hexanol, 2-methoxyethanol, 2-chloroethanol, isopropanol, phenol, butanol, propargyl alcohol, m-chlorophenyl, p-ethylphenol, o-methylphenol, naphthol, p-methoxyphenol, and o-phenylphenol, to produce the corresponding esters of vinylphosphonic acid.

EXAMPLE V

This example illustrates the process for producing the catechol cyclic ester of vinylphosphonic acid.

14.0 grams of the catechol cyclic ester of beta-chloroethylphosphonic acid were heated to a temperature of between about 220–280° C. and there was an immediate and rapid evolution of hydrogen chloride. The resulting product was distilled at atmospheric pressure and a temperature of 295°–300° C. to recover 10.0 grams of the catechol cyclic ester of vinylphosphonic acid as a white solid, melting at 76–82° C. This yield represents a 100% conversion.

The vinylphosphonic acid esters and half esters of the invention have valuable plant growth regulating properties, including the ability to control apical dominance, i.e., the lead bud which ordinarily dominates the plant and produces one stalk is stunted and the side buds are stimulated to produce more side shoot growth. The phosphonic esters are generally sprayed as an aqueous solution or emulsion onto the plants in amounts to provide between about 0.1 lb. and about 16 lbs. or higher, e.g., up to 25 or 30 lbs., of the compound per acre of plants. The plants which may be treated with the esters and half esters of the invention include, small grains, such as oats (*Avena sativa*), wheat (*Triticum aestivum*) and barley (Hordeum spp.); cotton (*Gossypium hirsutum*); privet (*Ligustrum ovalifolium*); soybeans (*Glycine max.*); snapbeans (*Phaseolus vulgaris*); tomatoes (*Lycopersicon esculentum*); kidney beans (*Phaseolus vulgaris*); and the like. The above plants are merely illustrative and do not limit the invention in any manner.

Plants treated with the vinylphosphonic acid esters and half esters of the invention have greater flower or fruit production, as illustrated by the following example:

EXAMPLE VI

Kidney bean plants (*Phaseolus vulgaris*) were sprayed at the third trifoleate stage with an aqueous-acetone solution of the catechol half ester of vinylphosphonic acid at a rate of 0.25 pound per acre. The plants seven weeks after the spraying was effected had a fruit count of 32 and a fruit weight of 136 grams as compared to a fruit count of 23 and a fruit weight of 100 grams for plants which were not sprayed.

The vinylphosphonic acid esters and half esters of the invention also show antioxidant activity in organic compositions and solutions thereof may be applied to iron, e.g., iron pipes, to inhibit the formation of ferric hydroxide. In addition, organic solutions of the esters of the invention, e.g., dissolved in hot oils, may be used as antiwear additives, antistatic agents, and dye receptors, e.g., by application to or incorporation in plastic foils or fibers.

In addition, the vinylphosphonic acid esters and half esters of the invention may be polymerised through the unsaturated carbon atoms, e.g., by heating the ester or half ester in the presence of a peroxide catalyst.

What is claimed is:

1. A compound having the following structural formula:

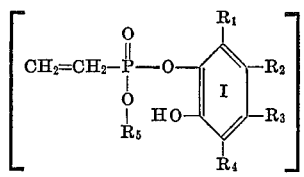

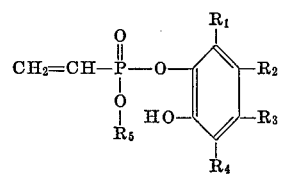

wherein $R_1$, $R_2$, $R_3$ and $R_4$ are selected from the group consisting of hydrogen, lower alkyl, halo and wherein $R_2$ and $R_3$ taken together with the ring to which they are attached form a naphthalene nucleus and $R_5$ is selected from the group consisting of hydrogen, an alkyl radical of 1 to 12 carbon atoms in which the carbon attached to the O-atom is non-tertiary, a lower alkenyl, a lower alkynyl, cyclohexyl, naphthyl, unsubstituted phenyl and the methyl, methoxyl, chloro and phenyl substituted phenyl radicals.

2. The compound as claimed in claim 1 wherein $R_5$ is hydrogen.

3. The compound as claimed in claim 1 wherein $R_1$, $R_2$, $R_3$ and $R_4$ are hydrogen.

4. The compound as claimed in claim 3 wherein $R_5$ is aryl.

5. The compound as claimed in claim 3 wherein $R_5$ is phenyl.

6. The compound as claimed in claim 1 wherein $R_5$ is hydrogen one of the $R_1$, $R_2$, $R_3$ and $R_4$ groups is halo, and the remaining groups are hydrogen.

7. The compound as claimed in claim 1 wherein the compound is:

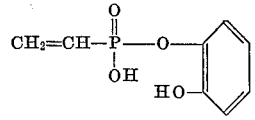

8. The compound as claimed in claim 1 wherein the compound is:

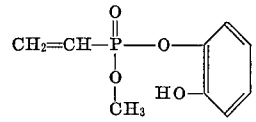

9. The method for producing a compound having the structural formula:

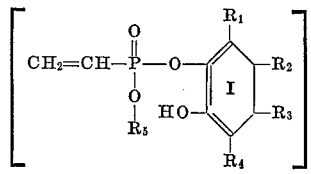

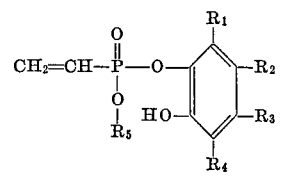

wherein $R_1$, $R_2$, $R_3$ and $R_4$ are selected from the group consisting of hydrogen, lower alkyl, halo and wherein $R_2$ and $R_3$ taken together with the ring to which they are attached form a naphthalene nucleus and $R_5$ is selected from the group consisting of an alkyl radical of 1 to 12 carbon atoms in which the carbon atom attached to the O-atom is non-tertiary, a lower alkenyl, a lower alkynyl, cyclohexyl, naphthyl, unsubstituted phenyl and the methyl, methoxyl, chloro and phenyl substituted phenyl radicals comprising reacting a compound (a) having the following structural formula:

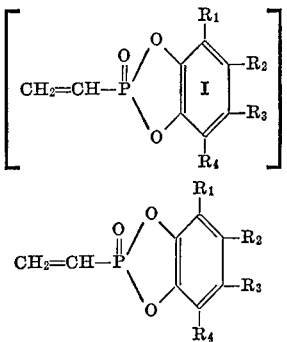

wherein $R_1$, $R_2$, $R_3$ and $R_4$ are as defined above, with an alcohol (b) having the following structural formula:

$R_5OH$ wherein $R_5$ is as defined above, at a temperature of about room temperature to about 150° C.

10. The method as claimed in claim 9 wherein the alcohol is methanol and the reaction is carried out at about room temperature.

11. The method as claimed in claim 9 wherein compound (a) is:

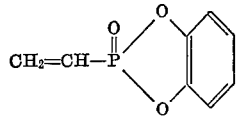

References Cited
UNITED STATES PATENTS
3,118,876  1/1964  Ukita et al. _____ 260—953X CHARLES B. PARKER, Primary Examiner A. H. SUTTO, Assistant Examiner U.S. Cl. X.R.

71—86; 260—982, 983